(12) United States Patent  (10) Patent No.: US 9,426,379 B2
Nonaka et al.  (45) Date of Patent: Aug. 23, 2016

(54) PHOTOGRAPHING UNIT, COOPERATIVE PHOTOGRAPHING METHOD, AND RECORDING MEDIUM HAVING RECORDED PROGRAM

(71) Applicant: Olympus Corporation, Hachioji-shi, Tokyo (JP)

(72) Inventors: Osamu Nonaka, Sagamihara (JP); Masahiro Hirata, Hino (JP)

(73) Assignee: Olympus Corporation, Tokyo (JP)

( * ) Notice: Subject to any disclaimer, the term of this patent is extended or adjusted under 35 U.S.C. 154(b) by 156 days.

(21) Appl. No.: 14/161,129

(22) Filed: Jan. 22, 2014

(65) Prior Publication Data

US 2014/0204234 A1  Jul. 24, 2014

(30) Foreign Application Priority Data

Jan. 23, 2013  (JP) .................................. 2013-010413

(51) Int. Cl.
  *H04N 5/235* (2006.01)
  *H04N 5/232* (2006.01)
  *H04N 5/247* (2006.01)

(52) U.S. Cl.
  CPC ......... *H04N 5/2354* (2013.01); *H04N 5/23203* (2013.01); *H04N 5/23216* (2013.01); *H04N 5/23293* (2013.01); *H04N 5/23296* (2013.01); *H04N 5/247* (2013.01)

(58) Field of Classification Search
  None
  See application file for complete search history.

(56) References Cited

U.S. PATENT DOCUMENTS

| 6,977,676 | B1 * | 12/2005 | Sato | ................. G08B 13/19628 348/14.08 |
| 2007/0109399 | A1 * | 5/2007 | Sekimoto | ............. H04N 5/2253 348/36 |
| 2008/0030592 | A1 * | 2/2008 | Border | ................... H04N 5/232 348/218.1 |

FOREIGN PATENT DOCUMENTS

JP  2005-236532  9/2005

* cited by examiner

*Primary Examiner* — Roberto Velez
*Assistant Examiner* — Yih-Sien Kao
(74) *Attorney, Agent, or Firm* — John C. Pokotylo; Straub & Pokotylo

(57) ABSTRACT

A photographing unit includes an image pickup portion which outputs a first image pickup image obtained through photographing of an object, a display control portion for displaying the first image pickup image from the image pickup portion and a second image pickup image from a different photographing unit on an identical display screen, an image comparison portion which compares the first image pickup image with the second image pickup image, and an angle-of-view display portion which controls the display control portion on the basis of a comparison result from the image comparison portion to display a display indicating an image pickup range of the first image pickup image in the second image pickup image.

14 Claims, 13 Drawing Sheets

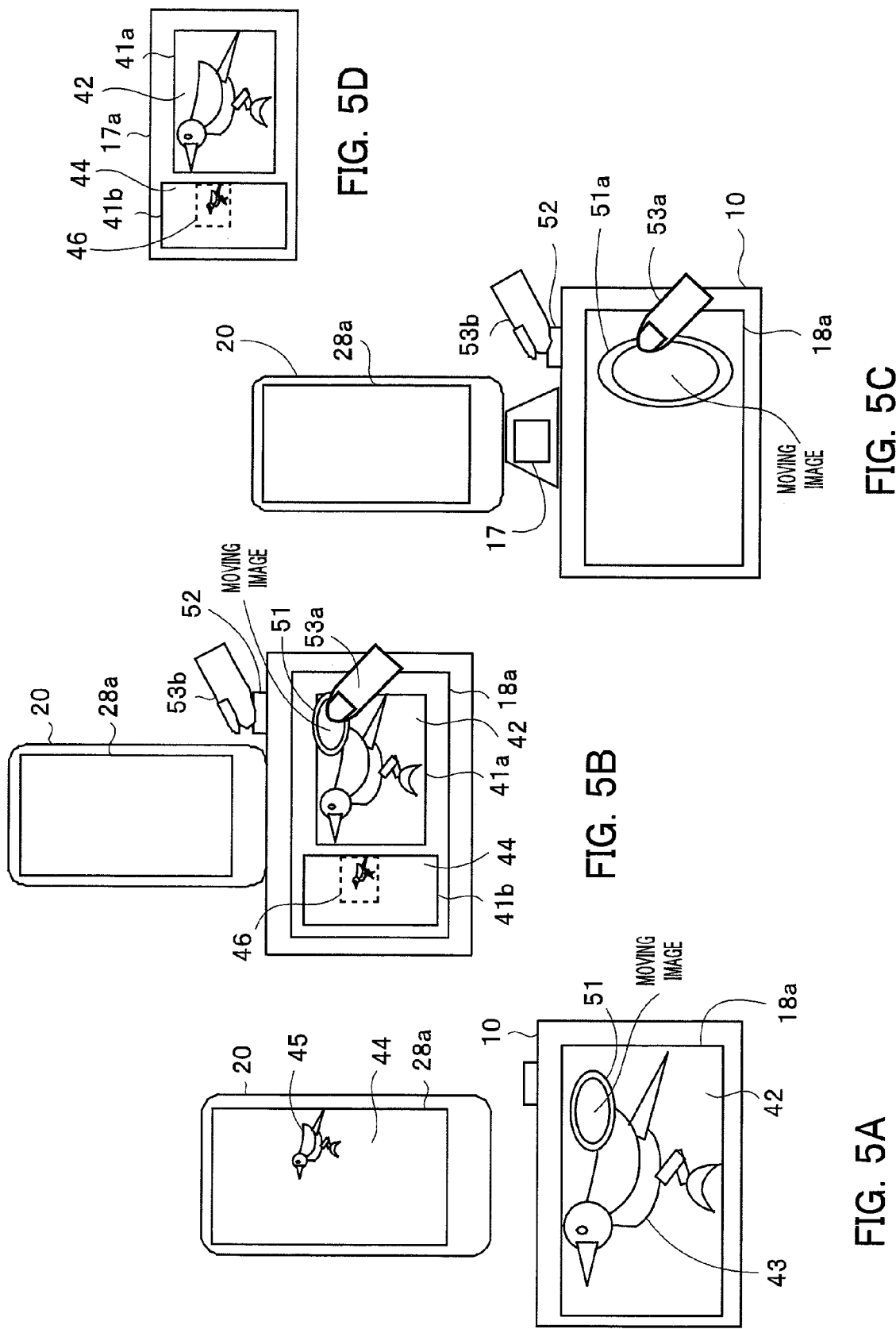

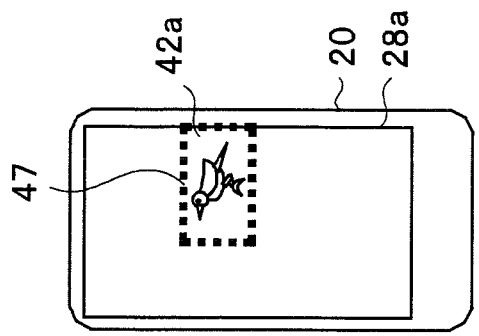
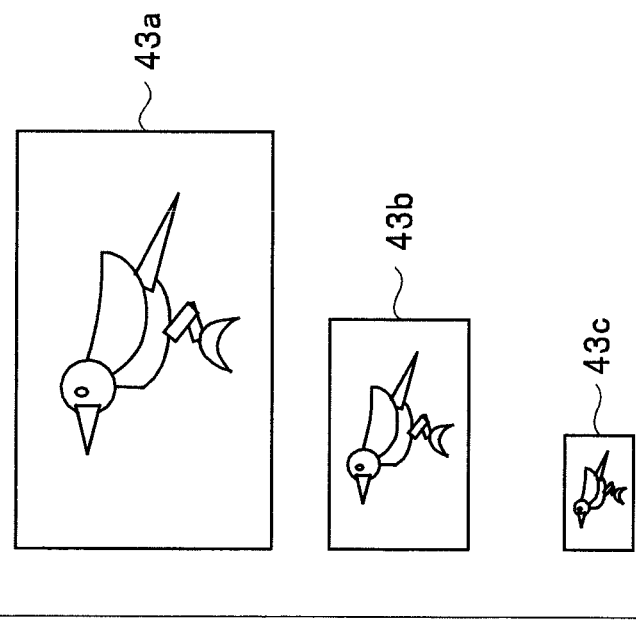
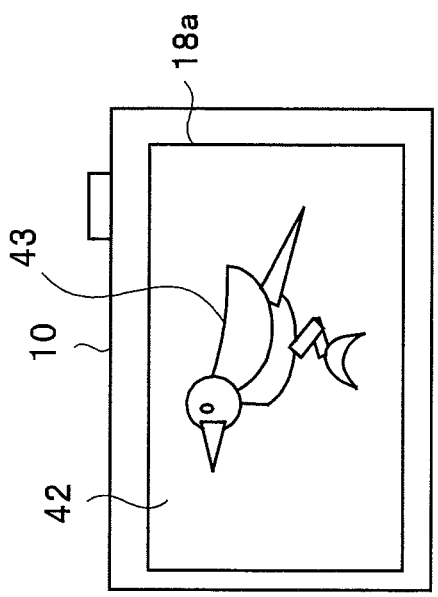
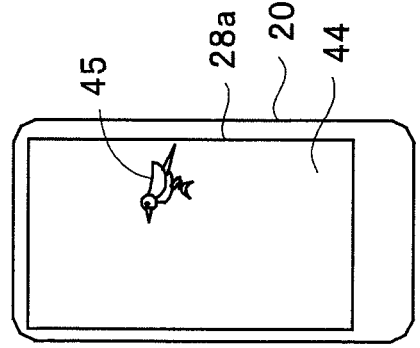

FIG. 12

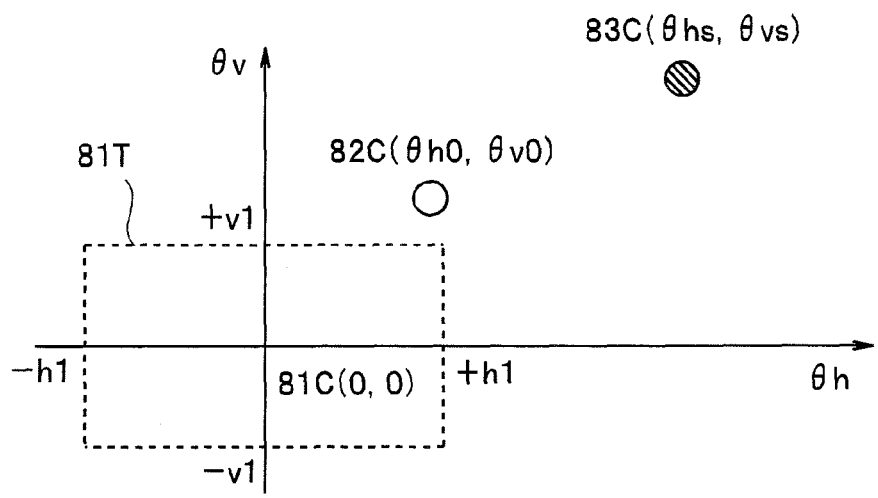

FIG. 13

| DISPLAY CONDITION | DIRECTION GUIDANCE DISPLAY |
|---|---|
| $-\theta h1 < \theta hs + \theta h0 < \theta h1$<br>$-\theta v1 < \theta vs + \theta v0 < \theta v1$ | NO DISPLAY |
| $-\theta h1 < \theta hs + \theta h0 < \theta h1$<br>$\theta vs + \theta v0 > \theta v1$ | ↑ |
| $\theta hs + \theta h0 > \theta h1$<br>$\theta vs + \theta v0 > \theta v1$ | ↗ |
| $\theta hs + \theta h0 > \theta h1$<br>$-\theta v1 < \theta vs + \theta v0 < \theta v1$ | → |
| $\theta hs + \theta h0 > \theta h1$<br>$-\theta v1 < \theta vs + \theta v0$ | ↘ |
| $-\theta h1 < \theta hs + \theta h0 < \theta h1$<br>$-\theta v1 > \theta vs + \theta v0$ | ↓ |
| $-\theta h1 > \theta hs + \theta h0$<br>$-\theta v1 < \theta vs + \theta v0$ | ↙ |
| $-\theta h1 > \theta hs + \theta h0$<br>$-\theta v1 < \theta vs + \theta v0 < \theta v1$ | ← |
| $-\theta h1 > \theta hs + \theta h0$<br>$\theta vs + \theta v0 > \theta v1$ | ↖ |

PHOTOGRAPHING UNIT, COOPERATIVE PHOTOGRAPHING METHOD, AND RECORDING MEDIUM HAVING RECORDED PROGRAM

CROSS REFERENCE TO RELATED APPLICATION

This application claims benefit of Japanese Application No. 2013-10413 filed in Japan on Jan. 23, 2013, the contents of which are incorporated by this reference.

BACKGROUND OF THE INVENTION

1. Field of the Invention

The present invention relates to a photographing unit which can confirm an object image by utilizing an image acquired by a different image pickup apparatus.

2. Description of the Related Art

Recent mobile units with a photographing function (photographing units), such as a digital camera, make full use of image processing and are provided with diverse photographing functions. Some photographing units are provided with a communication function and can transmit an image obtained through photographing to a different unit or onto a network.

For example, Japanese Patent Application Laid-Open Publication No. 2005-236532 discloses a digital camera system in which a wireless communication adapter having an antenna for wireless communication is detachably mounted to a hot shoe of a camera body in a digital camera having a function of wirelessly transferring photographed image data and a wireless communication adapter for a digital camera.

Shoes with an adapter for a smartphone which are intended to mount a smartphone to a shoe seat portion of a camera have been conventionally commercialized. Such shoes are advantageous when an identical object is photographed by both a smartphone and a photographing unit.

SUMMARY OF THE INVENTION

A photographing unit according to the present invention includes an image pickup portion which outputs a first image pickup image obtained through photographing of an object, a display control portion for displaying the first image pickup image from the image pickup portion and a second image pickup image from a different photographing unit on an identical display screen, an image comparison portion which compares the first image pickup image with the second image pickup image, and an angle-of-view display portion which controls the display control portion on the basis of a comparison result from the image comparison portion to display a display indicating an image pickup range of the first image pickup image in the second image pickup image.

A cooperative photographing method according to the present invention includes an image pickup step of photographing an object and acquiring a first image pickup image, an image comparison step of comparing the first image pickup image with a second image pickup image from a different photographing unit, and an angle-of-view display step of displaying the first image pickup image and the second image pickup image on an identical display screen and displaying a display indicating an image pickup range of the first image pickup image in the second image pickup image on the basis of a comparison result in the image comparison step.

A recording medium having a recorded program according to the present invention has a recorded program for causing a computer to execute an image pickup step of photographing an object and acquiring a first image pickup image, an image comparison step of comparing the first image pickup image with a second image pickup image from a different photographing unit, and an angle-of-view display step of displaying the first image pickup image and the second image pickup image on an identical display screen and displaying a display indicating an image pickup range of the first image pickup image in the second image pickup image on the basis of a comparison result in the image comparison step.

The above and other objects, features and advantages of the invention will become more clearly understood from the following description referring to the accompanying drawings.

BRIEF DESCRIPTION OF THE DRAWINGS

FIGS. 5A to 5D are explanatory views for explaining action of the first embodiment;

FIGS. 6A to 6D are explanatory views showing an example of an image comparison process in step S36 of FIG. 2;

FIG. 12 is an explanatory graph for explaining how to give guidance on the photographing direction by the photographing direction guidance portion 11f;

FIG. 13 is an explanatory chart for explaining how to give guidance on the photographing direction by the photographing direction guidance portion 11f;

DETAILED DESCRIPTION OF THE PREFERRED EMBODIMENTS

Embodiments of the present invention will be described below in detail with reference to the drawings.

First Embodiment

Figure 1:
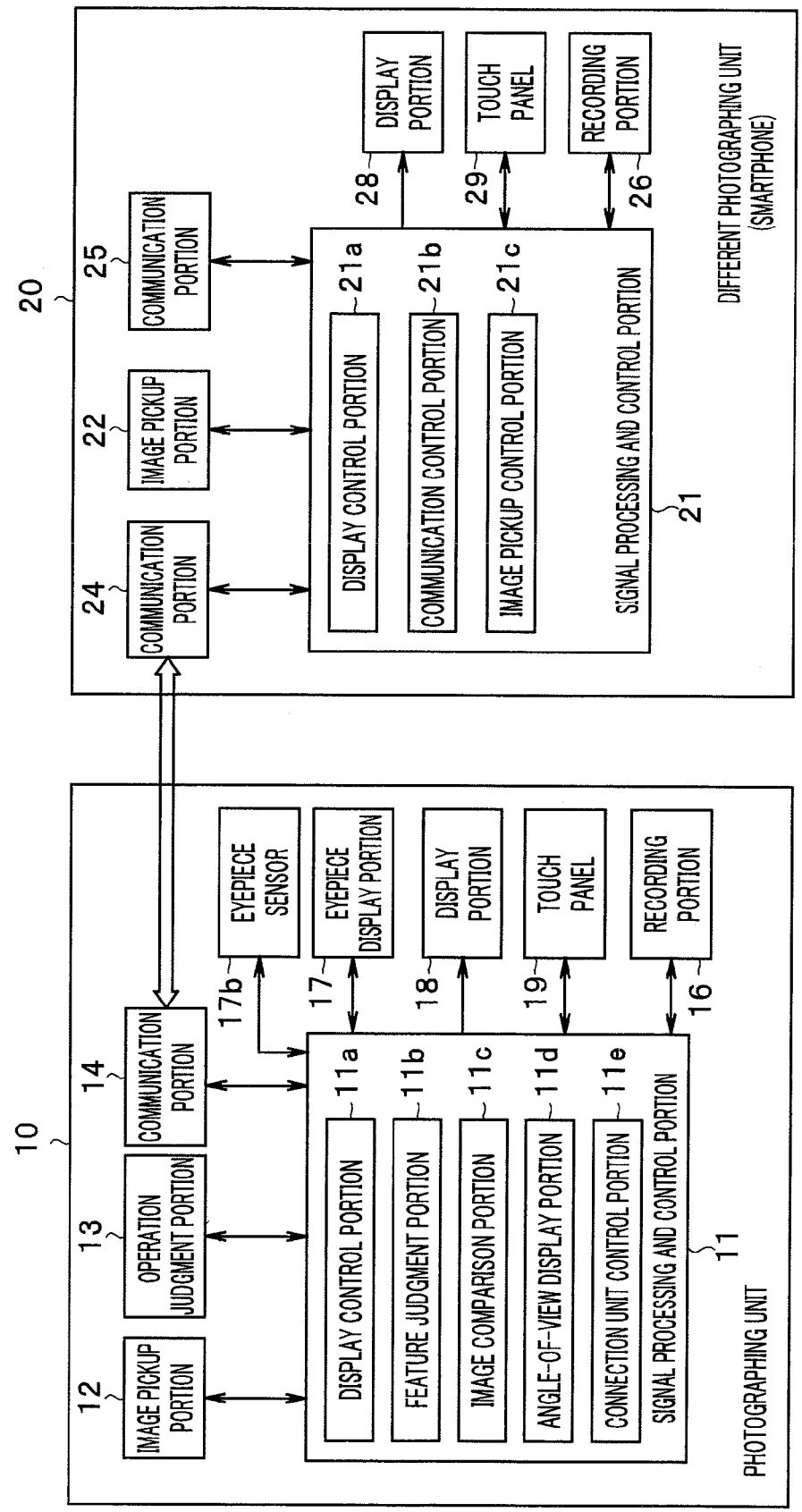
FIG. 1 is a block diagram showing a circuit configuration of a photographing unit according to a first embodiment of the present invention.

FIG. 1 is a block diagram showing a circuit configuration of a photographing unit according to a first embodiment of the present invention.

Referring to FIG. 1, a photographing unit 10 (a first photographing unit) has an image pickup portion 12 which is composed of an image pickup device, such as a CCD or CMOS sensor. The image pickup portion 12 captures an object image via a lens (not shown) which is provided at a front face of the photographing unit 10 and photoelectrically converts the object image to gain electrical signals of the object image. The electrical signals are subjected to AD conversion to gain image pickup image data. Under driving control by a signal processing and control portion 11, the image pickup portion 12 photographs an object and outputs an image pickup image (image pickup image data).

The signal processing and control portion 11 outputs a signal for driving the image pickup portion 12 to the image pickup portion 12 and reads out image pickup image data from the image pickup portion 12. The signal processing and control portion 11 performs predetermined signal processes, such as color adjustment processing, matrix conversion processing, noise removal processing, and various other signal processes, on the read-out image pickup image data.

An operation judgment portion 13 is also disposed at the photographing unit 10. The operation judgment portion 13 is configured to generate an operation signal based on a user operation of an operation portion which is provided at the photographing unit 10 and includes a release button, a function button, various switches for, e.g., photographing mode setting, and the like (not shown) and output the operation signal to the signal processing and control portion 11. The signal processing and control portion 11 controls individual portions on the basis of operation signals.

The signal processing and control portion 11 has a display control portion 11*a*, a feature judgment portion 11*b*, an image comparison portion 11*c*, an angle-of-view display portion 11*d*, and a connection unit control portion 11*e*. The display control portion 11*a* executes various processes related to display. The display control portion 11*a* can give image pickup image data after signal processing to a display portion 18 and an eyepiece display portion 17. The display portion 18 and the eyepiece display portion 17 each have an LCD, EL, or any other display screen and display an image given from the display control portion 11*a*. The display control portion 11*a* is also configured to be capable of displaying various menu displays and the like on the display screens.

A touch panel 19 is also provided at the photographing unit 10. For example, by providing the touch panel 19 on the display screen of the display portion 18, an operation signal corresponding to a position on the display screen which is pointed by a user with a finger can be generated. With the configuration, a user can easily perform, e.g., an operation of selecting an image displayed on the display screen of the display portion 18.

Note that the display portion 18 is disposed so as to cover, for example, a substantially entire area of a back face of the photographing unit 10 (see FIG. 3) and that a photographer can confirm a through image displayed on the display screen of the display portion 18 at the time of photographing and perform photographing operation while confirming the through image.

An observer can observe the display screen provided in the eyepiece display portion 17 via an eyepiece lens (not shown). The photographing unit 10 is also provided with an eyepiece sensor 17*b*. The eyepiece sensor 17*b* is configured to detect that a photographer has brought an eye (a face) close to the eyepiece display portion 17 and output a detection result to the signal processing and control portion 11.

The signal processing and control portion 11 can perform compression processing on an image pickup image after signal processing and give a compressed image to a recording portion 16 for recording. For example, a card interface can be adopted as the recording portion 16. The signal processing and control portion 11 is configured to be capable of causing the recording portion 16 to record image information, sound information, and the like on a recording medium, such as a memory card, and read out and reproduce image and sound information recorded on the recording medium.

An accessory shoe (a connection portion for mounting an accessory to a housing of the photographing unit 10) (not shown) is provided at the housing and is configured such that a different photographing unit 20, such as a smartphone, can be mounted to the accessory shoe. In the present embodiment, the photographing unit 10 is configured to be capable of photographing in cooperation with the different photographing unit 20. A communication portion 14 can communicate with a communication portion 24 which is provided at the different photographing unit 20, and the signal processing and control portion 11 and the different photographing unit 20 can send/receive data to/from each other. The signal processing and control portion 11 is thus configured to be capable of acting in a cooperative photographing mode of performing photographing in cooperation with the different photographing unit 20. The communication portion 14 and the communication portion 24 communicate by utilizing, for example, a wireless LAN. Alternatively, a communication line may be formed by connecting a connector (not shown) which is provided at the connection portion and a connector (not shown) which is provided at the different photographing unit 20.

The different photographing unit 20 can be composed of, for example, a smartphone. The different photographing unit 20 includes a signal processing and control portion 21, which controls individual portions of the different photographing unit 20. The different photographing unit 20 has a display control portion 21*a*, a communication control portion 21*b*, and an image pickup control portion 21*c*. The different photographing unit 20 includes a communication portion 25. The communication control portion 21*b* can control the communication portion 25 to send various data via a predetermined network, such as a telephone line, and to take in various data from the predetermined network.

The different photographing unit 20 (a second photographing unit) has an image pickup portion 22 which is composed of an image pickup device, such as a CCD or CMOS sensor. The image pickup portion 22 captures an object image via a lens (not shown) which is provided at a front face of the different photographing unit 20, photoelectrically converts the object image, and gains electrical signals of the object image. The electrical signals are subjected to AD conversion to gain image pickup image data. Under driving control by the signal processing and control portion 21, the image pickup portion 22 photographs an object and outputs image pickup image data. The image pickup control portion 21*c* outputs a signal for driving the lens of the image pickup portion 22 to the image pickup portion 22. The image pickup control portion 21*c* is capable of zoom control and focus control. The signal processing and control portion 21 reads out image pickup image data from the image pickup portion 22 and performs predetermined signal processes, such as color adjustment processing, matrix conversion processing, noise removal processing, and various other signal processes, on the read-out image pickup image data.

The display control portion 21*a* executes various processes related to display. The display control portion 21*a* can give an image pickup image after signal processing to a display portion 28. The display portion 28 has an LCD, EL, or any other display screen and displays image data for display given from the display control portion 21*a*. The display control portion 21*a* is also configured to be capable of displaying various menu displays and the like on the display screen.

A touch panel 29 is also provided at the different photographing unit 20. For example, by providing the touch panel 29 on the display screen of the display portion 28, an operation signal corresponding to a position on the display screen which is pointed by a user with a finger can be generated. With the configuration, a user can easily perform, e.g., an operation of selecting an image displayed on the display screen of the display portion 28.

Note that the display portion 28 is disposed so as to cover, for example, a substantially entire area of a one face of the different photographing unit 20 (see FIG. 3) and that a photographer can confirm a through image (live view image) displayed on the display screen of the display portion 28 at the time of photographing and perform photographing operation while confirming the through image.

The signal processing and control portion 21 can perform compression processing on image pickup image data after signal processing and give a compressed image to a recording portion 26 for recording. The signal processing and control portion 21 is configured to be capable of causing the recording portion 26 to record image information, sound information, and the like on a recording medium and read out and reproduce image and sound information recorded on the recording medium.

In the present embodiment, the connection unit control portion 11e of the signal processing and control portion 11 is configured to be capable of detecting connection of the different photographing unit 20 to the accessory shoe. For example, the signal processing and control portion 11 is configured to shift to the cooperative photographing mode when connection of the different photographing unit 20 to the accessory shoe is detected by the connection unit control portion 11e. The connection unit control portion 11e is configured to be capable of image pickup control, image sending control, display control, and other control for the different photographing unit 20 in the cooperative photographing mode.

In the cooperative photographing mode, the feature judgment portion 11b of the signal processing and control portion 11 judges a feature of image pickup image data (hereinafter also referred to as first image pickup image data) from the image pickup portion 12. For example, the feature judgment portion 11b sets a region of a predetermined size at a center of a first image pickup image as a feature detection region and obtains a feature of an image in the feature detection region. The feature judgment portion 11b may set, as the feature detection region, an image part within a range designated by a user in the first image pickup image and obtain a feature of the region.

The image comparison portion 11c is given image pickup image data (hereinafter also referred to as second image pickup image data) from the different photographing unit 20 via the communication portions 24 and 14 and judges whether there is an image part, having a feature substantially coinciding with the feature of the image in the feature detection region of the first image pickup image data, in the second image pickup image data. If there is a coincident image part, the image comparison portion 11c obtains a position of the image part on the first image pickup image.

The angle-of-view display portion 11d is given a detection result from the image comparison portion 11c and can produce a frame image indicating a range on the second image pickup image data corresponding to the feature detection region of the first image pickup image data.

In the present embodiment, the display control portion 11a is configured to be capable of displaying the first image pickup image data from the image pickup portion 12 and the second image pickup image data from the different photographing unit 20 on an identical display screen in the cooperative photographing mode. The display control portion 11a is further configured to be capable of displaying frame image data from the angle-of-view display portion 11d to be superimposed on the second image pickup image data.

Note that the signal processing and control portion 11 is also capable of sending the first image pickup image data to the different photographing unit 20 via the communication portions 14 and 24 and causing the communication control portion 21b of the different photographing unit 20 to send the first image pickup image data onto the predetermined network. Additionally, the signal processing and control portion 11 is configured to be capable of operating the different photographing unit 20 by generating an operation signal for the different photographing unit 20 on the basis of a user operation and sending the operation signal to the different photographing unit 20 via the communication portions 14 and 24. With the configuration, it is possible to perform photographing in the image pickup portion 22 of the different photographing unit 20 by operating the photographing unit 10.

Figure 2:
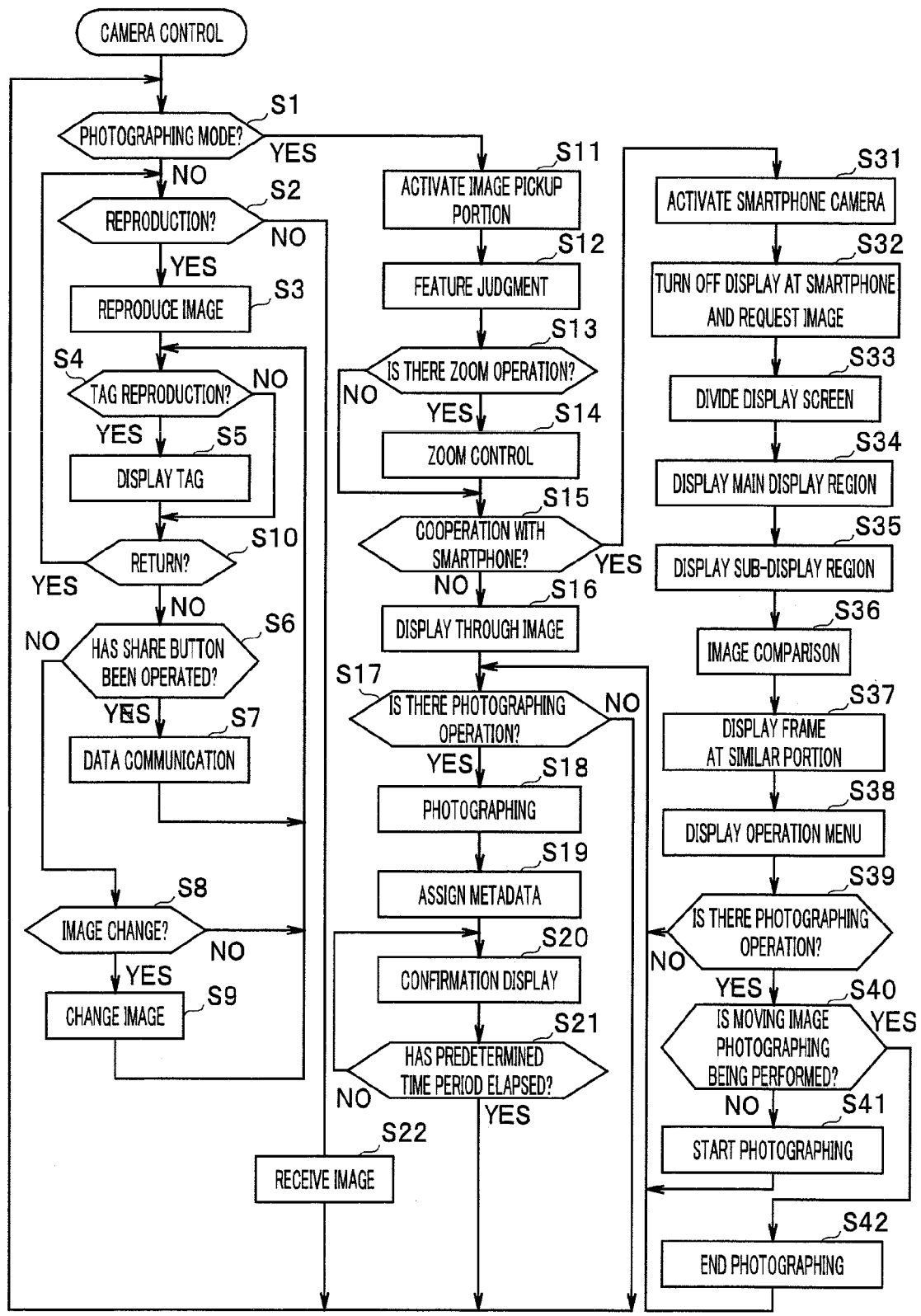
FIG. 2 is a flowchart showing camera control according to the first embodiment.
Figure 3:
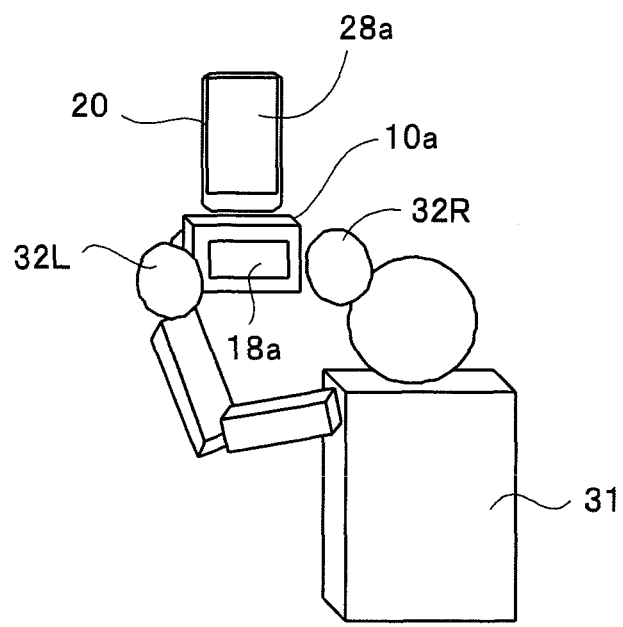
FIG. 3 is an explanatory view showing outer appearances of a photographing unit 10 and a different photographing unit 20 and how photographing is performed.
Figure 4:
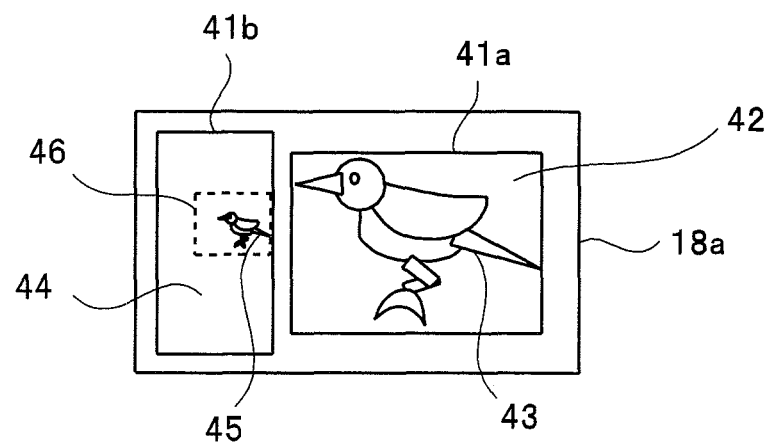
FIG. 4 is an explanatory view for explaining display on a display screen 18a of a display portion 18.

Action of the embodiment with the above-described configuration will now be described with reference to FIGS. 2 to 7. FIG. 2 is a flowchart showing camera control in the first embodiment. FIG. 3 is an explanatory view showing outer appearances of the photographing unit 10 and the different photographing unit 20 and how photographing is performed. FIG. 4 is an explanatory view for explaining display on a display screen 18a of the display portion 18. FIGS. 5A to 5D are explanatory views for explaining the action of the embodiment.

A photographer attaches the different photographing unit 20, such as a smartphone, to the accessory shoe (not shown) of the photographing unit 10. FIG. 3 shows the state. A photographer 31 can perform photographing with an object caught within a view range while, for example, grasping a housing 10a of the photographing unit 10 with a right hand 32R and a left hand 32L and viewing a through image displayed on the display screen 18a of the display portion 18. When the photographing unit 10 and the different photographing unit 20 are not working in cooperation with each other, an image pickup image which is gained through image pickup by the image pickup portion 22 of the different photographing unit 20 is displayed on a display screen 28a of the different photographing unit 20.

In the present embodiment, the photographing unit 10 and the different photographing unit 20 are configured to be capable of performing photographing in cooperation with each other. When the different photographing unit 20 is attached to the photographing unit 10, displays on the display screen 28a of the different photographing unit 20 are blacked out, and an image obtained through image pickup by the different photographing unit 20 is displayed on the display screen 18a of the photographing unit 10.

FIG. 4 shows the state. A main display region 41a for displaying first image pickup image data (a first image pickup image) from the image pickup portion 12 of the photographing unit 10 and a sub-display region 41b for displaying second image pickup image data from the image pickup portion 22 of the different photographing unit 20 are provided on the display screen 18a of the display portion 18. For example, assume that the photographing units 10 and 20 perform photographing in substantially identical directions and that the different photographing unit 20 performs wide-angle photographing while the photographing unit 10 performs telephoto photographing (assume that a second angle of view corresponding to a photographing range of the different photographing unit 20 is larger than a first angle of view corresponding to a photographing range of the photographing unit 10). Thus, image pickup of a region corresponding to a part of the photographing range for image pickup in the different photographing unit 20 is performed by the photographing unit 10. In the case, a wide-angle image 44 is displayed in the sub-display region 41*b* while a telephoto image 42 corresponding to a part of the wide-angle image 44 is displayed in the main display region 41*a*. The example in FIG. 4 shows that a bird image 45 (an object image) is displayed at a part of the wide-angle image 44. A bird image 43 (an object image) is displayed over a substantially entire area in the telephoto image 42.

In the present embodiment, an angle-of-view display 46, using a frame image indicating which image in the wide-angle image 44 the telephoto image 42 corresponds to and at which position the image is located, is displayed in the wide-angle image 44.

The provision of the display regions 41*a* and 41*b* for displaying image pickup images from both the photographing units 10 and 20 on the display screen 18*a* of the photographing unit 10 allows a photographer to easily confirm both the images. Note that the display portion 28 of the different photographing unit 20 may be blacked out, which allows a reduction in power consumption of the different photographing unit 20. For example, displaying a full view (the photographing range of the photographing unit 10 and a region outside the range) in the sub-display region 41*b* and a part desired to be photographed (the photographing range of the photographing unit 10) of the full view in the main display region 41*a* facilitates confirmation of the photographing range, within which an image is desired to be picked up by the photographing unit 10. For example, even if an object, an image of which is to be picked up by the photographing unit 10, makes a motion and fails to be tracked, it is easy to find the target object and track the object again by confirming the wide-angle image 44 in the sub-display region 41*b*. Additionally, the angle-of-view display 46 (the first angle of view) indicating a range of the telephoto image 42 being picked up by the photographing unit 10 is displayed in the wide-angle image 44 (the second angle of view), and confirmation of a position of an object is extremely easy.

The above-described camera control will be described with reference to FIG. 2.

In step S1 of FIG. 2, the signal processing and control portion 11 judges whether a photographing mode has been set. If an instruction to enter the photographing mode has not been given, the signal processing and control portion 11 judges in step S2 whether an instruction to enter a reproduction mode has been given. When an instruction to enter the reproduction mode is given, the signal processing and control portion 11 reproduces an image in step S3. If a user gives an instruction to reproduce a tag which is related information associated with the reproduced image, the signal processing and control portion 11 shifts a current process from step S4 to step S5 to display the information related to the reproduced image (the tag).

The signal processing and control portion 11 judges in step S6 whether a share button for making public an image pickup image has been operated. The share button (not shown) is disposed at the photographing unit 10. The user operates the share button if the user desires to transfer image pickup image data to a server or the like on a network line, such as the Internet.

In the present embodiment, when the share button is operated, the signal processing and control portion 11 of the photographing unit 10 sends image pickup image data together with a command to control communication by the photographing unit 20 to the different photographing unit 20 via the communication portion 14. The communication control portion 21*b* of the different photographing unit 20 controls the communication portion 25 to send the image pickup image data transferred from the photographing unit 20 onto a network line (not shown) in accordance with the command from the photographing unit 10 (step S7). In the above-described manner, even if the photographing unit 10 does not have a communication portion for connecting to a network line, the photographing unit 10 can send image data by utilizing the communication portion of the different photographing unit 20.

If the user gives an instruction to change an image to be reproduced, the signal processing and control portion 11 shifts the current process from step S8 to step S9 to change image data to be reproduced. If an instruction to enter the reproduction mode has not been given in step S2, the signal processing and control portion 11 receives image data via the different photographing unit 20 in step S22 and returns the current process to step S1.

Assume here a case where a user gives an instruction to enter the photographing mode. The signal processing and control portion 11 activates the image pickup portion 12 and captures image pickup image data in step S11. The feature judgment portion 11*b* of the signal processing and control portion 11 performs feature judgment in step S12. A feature of an image pickup image obtained by the image pickup portion 12 is judged by the feature judgment portion 11*b*. The feature is used for image comparison (to be described later).

Presence or absence of a zoom operation is judged in step S13. If there is a zoom operation, zoom control is performed (step S14). In step S15, it is judged whether a mode of photographing in cooperation with a different photographing unit (cooperation with a smartphone) has been set. For example, if the different photographing unit 20, such as a smartphone, is attached to the accessory shoe of the photographing unit 10, the attachment is detected by the connection unit control portion 11*e*, and the cooperative photographing mode is set.

If the cooperative photographing mode is not presently set, the photographing unit 10 and the different photographing unit 20 act singly. For example, FIG. 5A shows a state in which photographing in substantially identical directions is performed by the photographing unit 10 and the different photographing unit 20, respectively. In the photographing unit 10, photographed image data is displayed as a through image (step S16). How the telephoto image 42 including the image 43 is displayed on the display screen 18*a* of the photographing unit 10 and how the wide-angle image 44 including the image 45 is displayed on the display screen 28*a* of the different photographing unit 20 are shown in FIG. 5A. Note that an operation button 51 for moving image photographing is displayed on the display screen 18*a*.

When a photographing operation is performed, the signal processing and control portion 11 detects the photographing operation in step S17 and performs photographing in step S18. Image pickup image data from the image pickup portion 12 is subjected to predetermined signal processing by the signal processing and control portion 11. The signal processing and control portion 11 assigns metadata in step S19 and records the metadata together with the image pickup image data in the recording portion 16. In step S20, a REC view display (confirmation display) is provided until a predetermined time period elapses (step S21).

When the different photographing unit 20 is attached to the accessory shoe of the photographing unit 10, the cooperative photographing mode is set, and the current process shifts from step S15 to step S31. The connection unit control portion 11e activates the image pickup portion 22 of the different photographing unit 20 and instructs the different photographing unit 20 to perform wide-angle photographing (step S31). The connection unit control portion 11e then blacks out the display portion 28 of the different photographing unit 20 and causes image pickup image data which is obtained through image pickup by the image pickup portion 22 to be transferred via the communication portions 24 and 14 (step S32).

The display control portion 11a sets the main display region 41a and the sub-display region 41b on the display screen 18a of the display portion 18 (step S33), displays the image pickup image data based on the image pickup portion 12 in the main display region 41a (step S34), and displays an image pickup image based on the image pickup portion 22 in the sub-display region 41b (step S35).

FIG. 5B shows the state. The photographing unit 10 and the different photographing unit 20 perform image pickup in substantially identical directions, respectively. The photographing unit 10 performs telephoto image pickup while the different photographing unit 20 performs wide-angle image pickup (the second angle of view corresponding to the photographing range of the different photographing unit 20 is larger than the first angle of view corresponding to the photographing range of the photographing unit 10). The display screen 28a of the photographing unit 20 is blacked out, and the main display region 41a and the sub-display region 41b are displayed on the display screen 18a of the photographing unit 10. The telephoto image 42 from the image pickup portion 12 is displayed in the main display region 41a while the wide-angle image 44 from the image pickup portion 22 is displayed in the sub-display region 41b.

In next step S36, a subroutine is called, and image comparison by the image comparison portion 11c is performed. The image comparison portion 11c obtains in which region in the wide-angle image 44 an image similar to the telephoto image 42 in the main display region 41a is present, by using the feature of the image obtained in step S12, and outputs a range corresponding to the region as a detection result. The angle-of-view display portion 11d is given the detection result from the image comparison portion 11c, generates display data for displaying, in the wide-angle image 44, a frame image based on the detection result from the image comparison portion 11c and indicating the range and outputs the display data to the display control portion 11a. In the above-described manner, the angle-of-view display 46 is displayed with the frame image in the sub-display region 41b given by the display control portion 11a (step S37). The angle-of-view display 46 may use a display form other than the frame image. For example, tone of image data within a region indicated by the frame image and tone of image data outside the region may be made different without use of the frame image. Alternatively, resolution of the image data within the region indicated by the frame image and resolution of the image data outside the region may be made different. Any other display form may be used as long as a difference between the image data within the region indicated by the frame image and the image data outside the region can be clarified.

In step S38, the operation button 51 for moving image photographing is displayed on the display screen 18a by the display control portion 11a. In next step S39, the signal processing and control portion 11 detects an operation of the operation button 51 for moving image photographing and judges whether an instruction for moving image photographing has been given. If the operation button 51 is touched by a finger 53a, the signal processing and control portion 11 judges in step S40 whether moving image photographing is being performed. The signal processing and control portion 11 starts moving image photographing (step S41) if moving image photographing is not being performed and ends moving image photographing (step S42) if moving image photographing is being performed. Note that if the user presses and operates a shutter button 52 with a finger 53b, the current process shifts from step S39 to S17 to perform still image photographing (step S18).

As described above, the angle-of-view display 46 indicating in which region of the sub-display region 41b the image pickup image displayed in the main display region 41a is displayed is displayed within the sub-display region 41b. A user can recognize an approximate photographing direction of the telephoto image 42 picked up by the image pickup portion 12 by utilizing the angle-of-view display 46 displayed in the wide-angle image 44. The configuration is extremely useful for composition setting and the like.

Note that although an example in which the main display region 41a and the sub-display region 41b are set at the display portion 18 provided at the back face of the housing 10a of the photographing unit 10 has been described with reference to FIG. 5B, the regions may be provided at the eyepiece display portion 17 to display pieces of image pickup image data from the image pickup portions 12 and 22.

FIGS. 5C and 5D show an example in the case. FIG. 5C shows the outer appearances of the photographing units 10 and 20, and FIG. 5D shows display on a display screen 17a of the eyepiece display portion 17. As shown in FIG. 5D, in the eyepiece display portion 17 as well, the main display region 41a and the sub-display region 41b are set, the telephoto image 42 and the wide-angle image 44 are displayed, and the angle-of-view display 46 is displayed in the wide-angle image 44. Note that in the case, an operation button 51a for moving image photographing is displayed on the display screen 18a of the display portion 18. The operation button 51a is displayed with a sufficiently large size such that a user can reliably operate the operation button 51a while looking into the eyepiece display portion 17.

Note that although an example in which moving image photographing is performed in the photographing unit 10 has been described in step S41 of FIG. 2, the connection unit control portion 11e may control the different photographing unit 20 to perform moving image photographing in the different photographing unit 20 in response to a moving image photographing operation. In the case, in the metadata assignment process in step S19, a movie obtained through moving image photographing by the different photographing unit 20 may be assigned as metadata for the still image photographing in step S18. Alternatively, a movie at a predetermined time before or after the still image photographing in step S18 may be automatically recorded as metadata, regardless of presence or absence of a moving image photographing operation.

Figure 7:
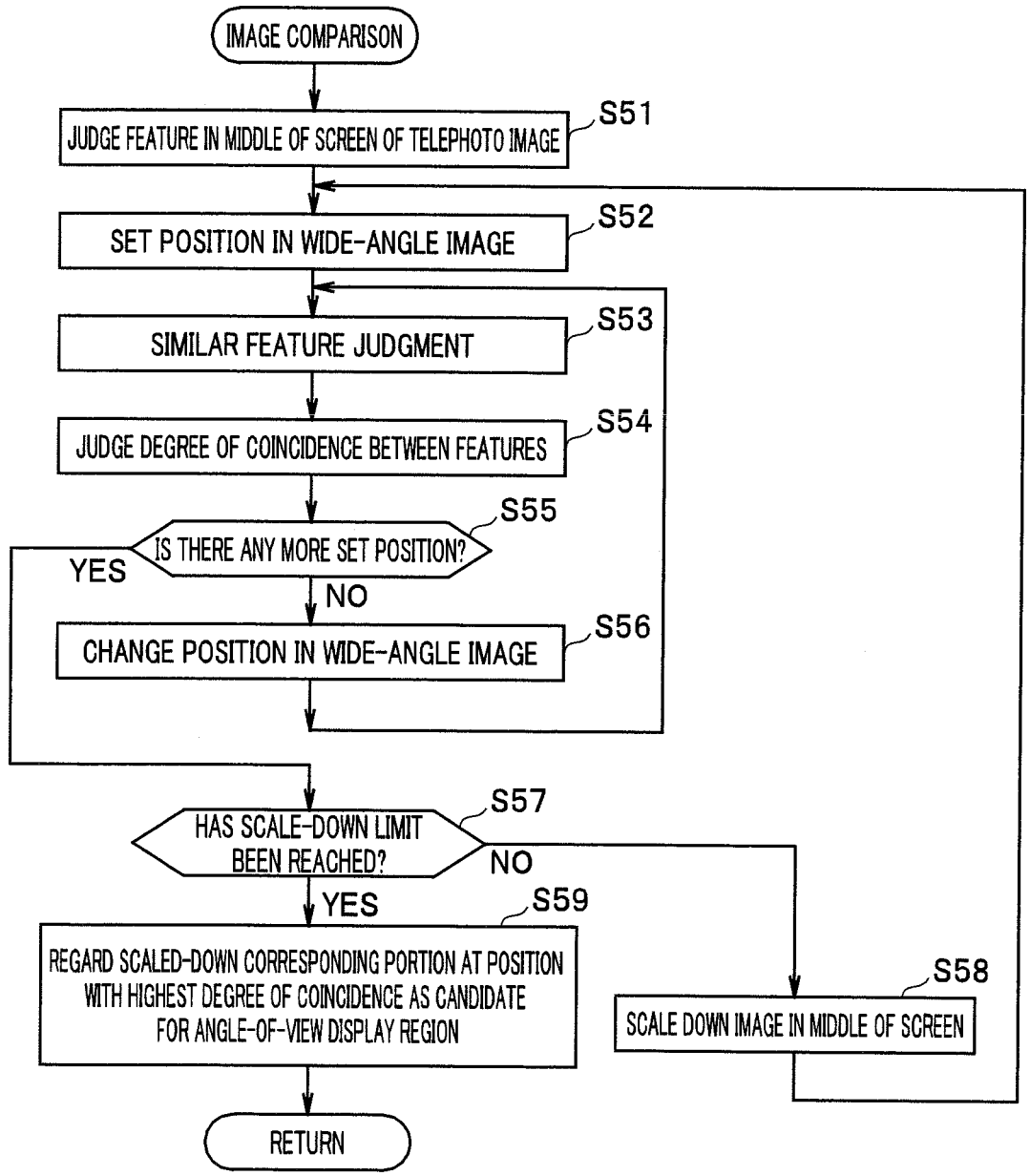
FIG. 7 is a flowchart showing an action flow of the image comparison process.

FIGS. 6A to 6D are explanatory views showing an example of the image comparison process in step S36 of FIG. 2. FIG. 7 is a flowchart (subroutine) of the image comparison process. FIG. 6A shows how the telephoto image 42 picked up by the image pickup portion 12 of the photographing unit 10 is displayed on the display screen 18a, and FIG. 6B shows how the wide-angle image 44 picked up by the image pickup portion 22 of the different photographing unit 20 is displayed on the display screen 28a. The image 45 in the wide-angle image 44 and the image 43 in the telephoto image 42 are obtained through image pickup of a bird which is an identical object.

The feature judgment portion 11b judges a feature of an image (hereinafter referred to as a judgment target image) at a center of the screen of the image pickup image (the telephoto image 42) from the photographing unit 10 in step S51 of FIG. 7. Then, the image comparison portion 11c sets a judgment position in the image pickup image (the wide-angle image 44) from the different photographing unit 20 and compares a feature of an image at the set judgment position with a result of the feature judgment on the judgment target image obtained in step S51 for coincidence.

For example, assume that an image 43a in FIG. 6C is the judgment target image. The image comparison portion 11c sets a judgment region identical in size to the image 43a at the predetermined judgment position in the wide-angle image 44, performs similar feature judgment (step S53), and obtains the degree of coincidence in feature (step S54).

The image comparison portion 11c causes the judgment region to move in the wide-angle image 44 (step S56) and repeats the similarity judgment in steps S53 and S54. When similarity judgment of the judgment region ends for all judgment positions, the image comparison portion 11c shifts a current process from step S55 to step S57 to judge whether a scale-down limit of the judgment target image has been reached. If the scale-down limit has not been reached, the image comparison portion 11c shifts to step S58. The image comparison portion 11c scales down the judgment target image at the center of the screen (step S58) and repeats steps S52 to S56.

When the scale-down limit of the judgment target image has been reached, the image comparison portion 11c regards the judgment region at a position with a highest degree of coincidence in feature as a scaled-down corresponding portion and sets the part as a candidate for an angle-of-view display region. For example, as shown in FIG. 6C, the image comparison portion 11c sequentially scales down the judgment target image from the image 43a to an image 43b and from the image 43b to an image 43c to perform judgment of similarity between each of the images and an image in the judgment region of the wide-angle image 44. For example, if the degree of coincidence of the judgment region coinciding with the image 43c is highest, the image comparison portion 11c regards the judgment region as an image corresponding to the judgment target image in the wide-angle image 44. FIG. 6D shows a judgment region 47 indicated by a broken line.

As described above, in the present embodiment, the angle-of-view display 46 indicating a position of the judgment region 47 is displayed in the sub-display region 41b by using a frame image.

Note that although the feature judgment portion 11b has been described as performing feature judgment in the middle of the screen in FIG. 7, a user may designate a position for feature judgment.

As described above, in the present embodiment, a local photographing unit controls a different photographing unit connected to the local photographing unit and displays an image pickup image from the local photographing unit and an image pickup image from the different photographing unit on an identical screen, in the cooperative photographing mode. The local photographing unit displays which image in the image pickup image from the different photographing unit the image pickup image from the local photographing unit corresponds to and in which region the image is located, by using an angle-of-view display. With the configuration, it is possible to track again an object which the local photographing unit has failed to track by utilizing the image pickup image from the different photographing unit. Additionally, power consumption can be curbed by blacking out a display portion of the different photographing unit. In addition, the local photographing unit can perform communication control of the different photographing unit and can send an image photographed by the local photographing unit to a predetermined network via the different photographing unit. Thus, even a photographing unit without a function of communicating with a network is capable of data communication, such as making an image public.

Second Embodiment

Figure 8:
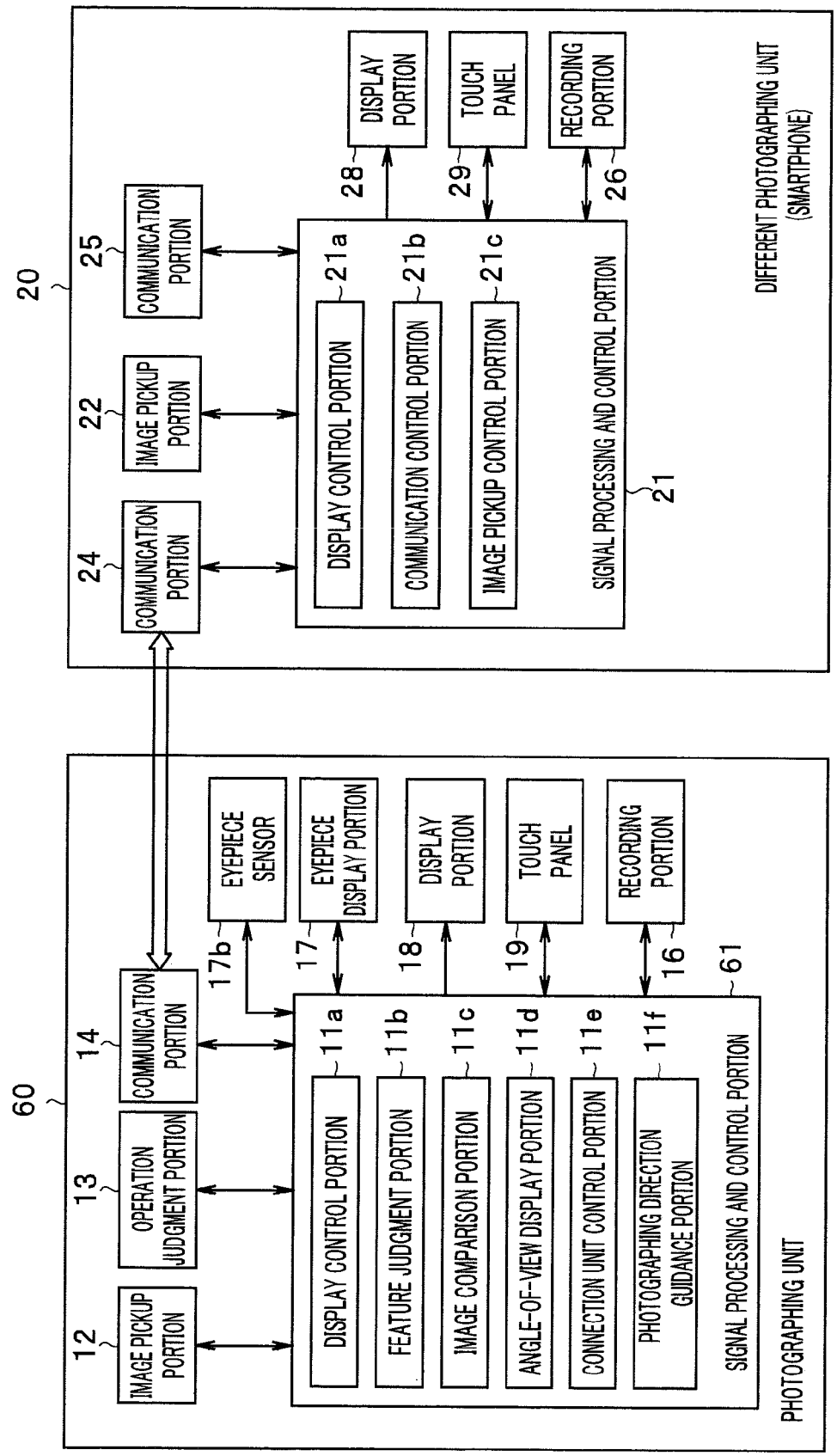
FIG. 8 is an explanatory diagram for explaining a second embodiment of the present invention.

FIG. 8 is an explanatory diagram for explaining a second embodiment of the present invention. Constituent elements in FIG. 8 identical to the constituent elements in FIG. 1 are denoted by identical reference numerals, and a description of the constituent elements will be omitted. The present embodiment facilitates tracking of an object in a cooperative photographing mode.

A photographing unit 60 in the present embodiment is different from the first embodiment in that a signal processing and control portion 61 with an added photographing direction guidance portion 11f is adopted. In the present embodiment, a different photographing unit 20 picks up a wide-angle image, and the photographing unit 60 picks up an image of an object within the wide-angle image with a telephoto setting. In the case, a photographing direction for photographing by the photographing unit 60 can be designated by utilizing the wide-angle image of the object serving as a tracking target that is picked up by the different photographing unit 20.

In order to allow designation of the photographing direction equally for all directions, it is preferable that an optical axis of a taking lens of the different photographing unit 20 and an optical axis of a taking lens of the photographing unit 60 coincide (directions for photographing coincide). Thus, work of adjusting the optical axis of the photographing unit 60 and the optical axis of the different photographing unit 20 is performed before actual photographing.

Figure 9:
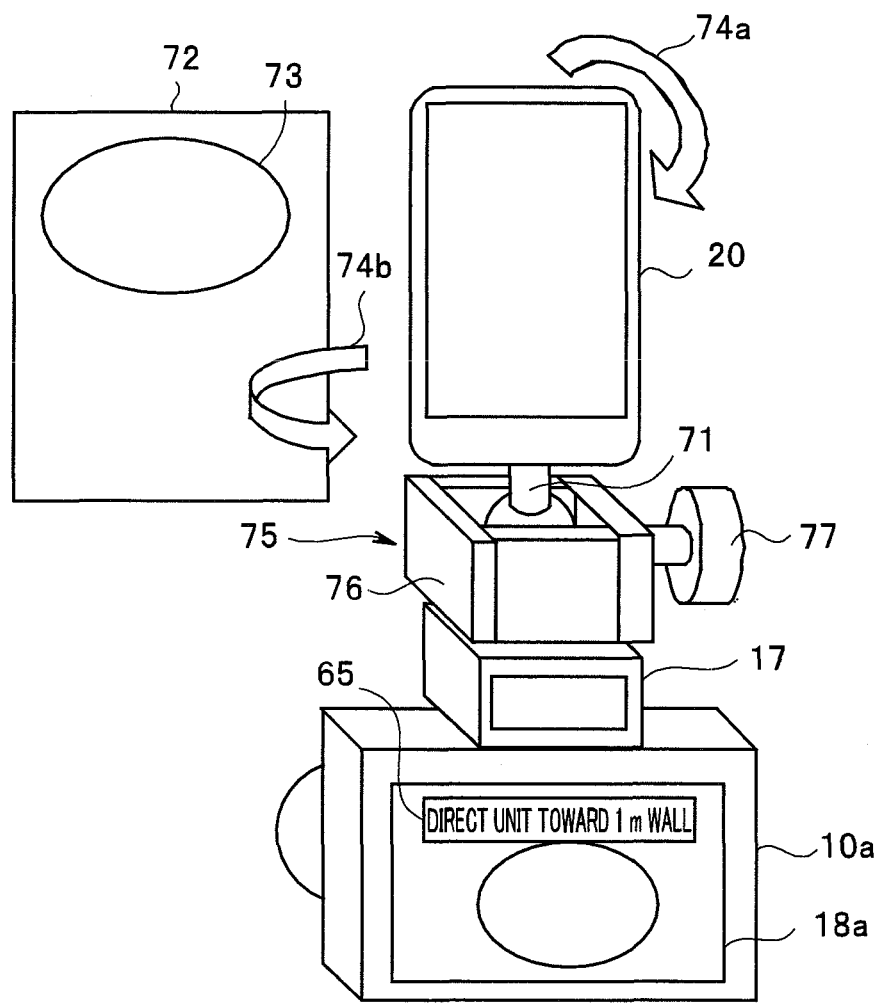
FIG. 9 is an explanatory view showing a mechanism for allowing adjustment work for optical axis alignment.
Figure 10:
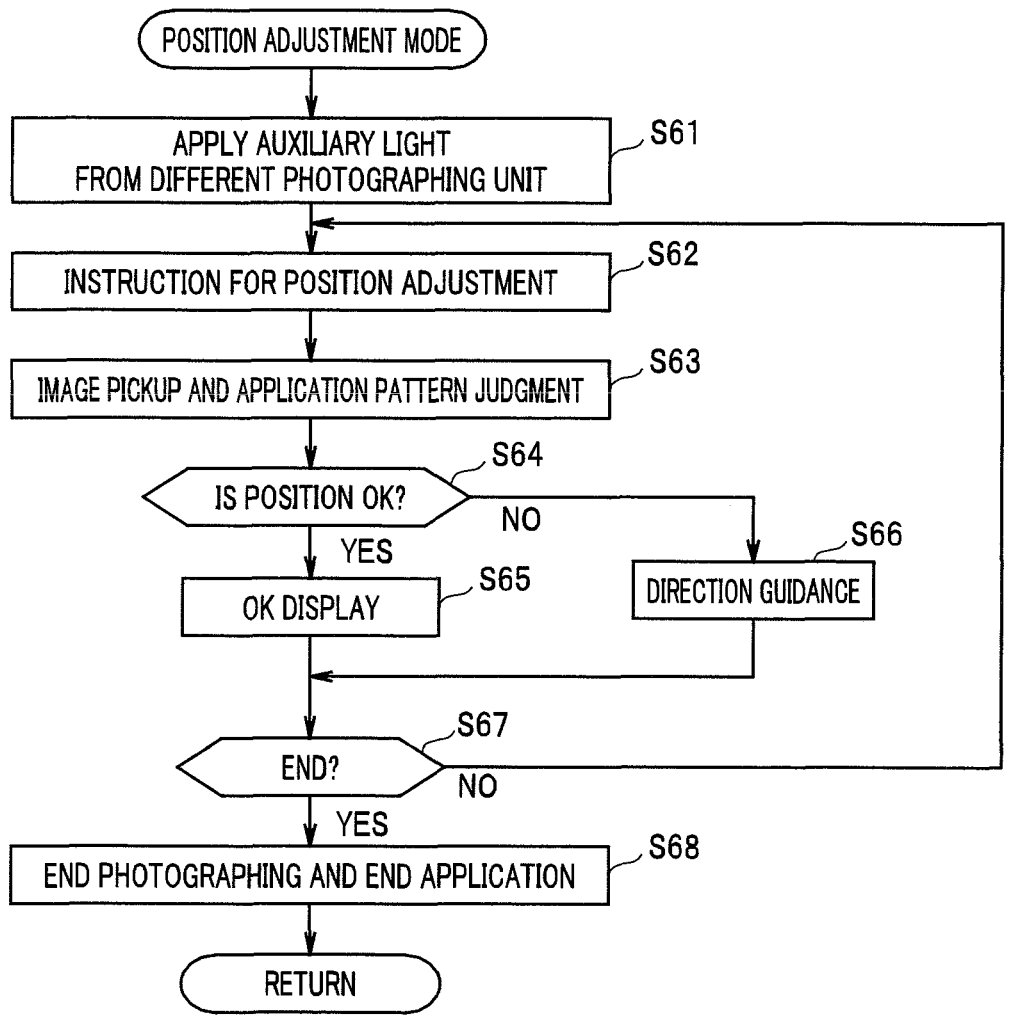
FIG. 10 is a flowchart showing an action flow of adjustment work by a signal processing and control portion 61.

FIG. 9 is an explanatory view showing a mechanism for allowing the optical axis alignment adjustment work. FIG. 10 is a flowchart showing an action flow of adjustment work by the signal processing and control portion 61. Note that the mechanism in FIG. 9 and the action flow in FIG. 10 can also be applied to the photographing unit 10 in the first embodiment. Note that the adjustment work for causing the optical axes to coincide with each other shown in FIGS. 9 and 10 is not a component essential to the present embodiment and that a direction of field of view can be designated without the adjustment work for optical axis coincidence.

Referring to FIG. 9, a housing 10a of the photographing unit 60 and the different photographing unit 20 are coupled by a screw and ball joint 75. An eyepiece display portion 17 is disposed at an upper surface of the housing 10a, and the screw and ball joint 75 is disposed at an upper surface of the eyepiece display portion 17. The screw and ball joint 75 is composed of a mounting body 76 having a spherical surface reception portion and a ball stud 71, a spherical portion of which is slidably supported on the spherical surface reception portion. The different photographing unit 20 is mounted and fixed to an upper end of the ball stud 71.

By tightening a screw 77, the spherical surface reception portion of the mounting body 76 and the ball stud 71 are fixed to each other. By loosening the screw 77, the spherical portion of the ball stud 71 is slidable with respect to the spherical surface reception portion, and the different photographing unit 20 can be rotated about the spherical portion in an elevation/depression angle direction indicated by an arrow 74a and in an azimuth angle direction indicated by an arrow 74b in FIG. 9. By tightening the screw 77 after causing the optical axis of the different photographing unit 20 to coincide with the optical axis of the photographing unit 60, the photographing units 60 and 20 can be fixed with the coinciding optical axes.

For example, in step S61 of FIG. 10, the photographing unit 60 causes the different photographing unit to apply auxiliary light. FIG. 9 shows a state in which the auxiliary light is applied to a chart 72 which is arranged in front of the different photographing unit 20. With the auxiliary light, an ellipsoidal high-luminance portion 73 appears on the chart 72. In step S62, a message display giving an instruction to perform optical axis position adjustment is displayed on a display screen 18a of a display portion 18. In the example in FIG. 9, a message display saying "Direct the unit toward a 1-meter wall." is displayed.

In next step S63, an image of the high-luminance portion 73 of the chart 72 is picked up by an image pickup portion 12 of the photographing unit 60. FIG. 9 shows a state in which the high-luminance portion 73 is displayed as a through image on the display screen 18a. An application pattern is judged on the basis of shape and luminance distribution of an image part corresponding to the high-luminance portion 73 in the image pickup image gained by the image pickup portion 12. By comparing the application pattern judged by the photographing unit 60 with an application pattern of the high-luminance portion 73 obtained from the auxiliary light applied by the different photographing unit 20, whether the optical axes of the photographing unit 60 and the different photographing unit 20 coincide or a direction of divergence in optical axis can be judged.

If the optical axes coincide, the flow shifts from step S64 to step S65 to display an OK display on, for example, the display screen 18a. On the other hand, if the optical axes do not coincide, a direction guidance display indicating in which direction the different photographing unit 20 is to be directed is displayed on, for example, the display screen 18a in step S66. In the case, a user changes orientation of the different photographing unit 20 in accordance with the direction guidance display.

After the change, the processes in steps S62 to S66 are repeated until the OK display is displayed. When the processes end, photographing by the photographing unit 60 and auxiliary light application by the different photographing unit 20 are ended.

Referring to FIG. 8, the photographing direction guidance portion 11f is configured to be capable of giving guidance on a direction in which the photographing unit 60 is to perform photographing (the photographing direction) on the basis of an image pickup image from the photographing unit 60 and an image pickup image from the different photographing unit 20. For example, even if a tracking target is located at a position outside an image pickup range of the photographing unit 60, the photographing direction guidance portion 11f can give guidance on the photographing direction of the photographing unit 60 when the tracking target is located within an image pickup range of the different photographing unit 20. Note that possible tracking targets include an object (hereinafter referred to as a target object) designated by a user. For example, the target object can be designated through an operation of touching a display screen of the photographing unit 60. Even if the target object falls outside the image pickup range of the photographing unit 60, guidance on the photographing direction of the photographing unit 60 can be given for tracking the target object again when image pickup of the target object is being performed by the different photographing unit 20.

Note that the photographing unit 60 may automatically judge an object in motion at a predetermined speed or a higher speed as a tracking target. It is also possible to designate shape of a bird, an animal, a person, or the like as the target object. In the case, after the designated target object falls within the image pickup range of the photographing unit 60, guidance on the photographing direction can be given.

Note that if the optical axis of the photographing unit 60 and the optical axis of the different photographing unit 20 coincide, when the different photographing unit 20 is performing photographing with a wider angle than the photographing unit 60 (a second angle of view is larger than a first angle of view), an image of a tracked object falling within the image pickup range of the photographing unit 60 is invariably picked up by the photographing unit 20, guidance on the photographing direction can be given after the image pickup. However, even if the optical axis of the photographing unit 60 and the optical axis of the different photographing unit 20 do not coincide, guidance on the photographing direction can be given as long as image pickup of a tracking target falling within both the image pickup ranges of the photographing unit 60 and the photographing unit 20 continues to be performed by the photographing unit 20.

Figure 11:
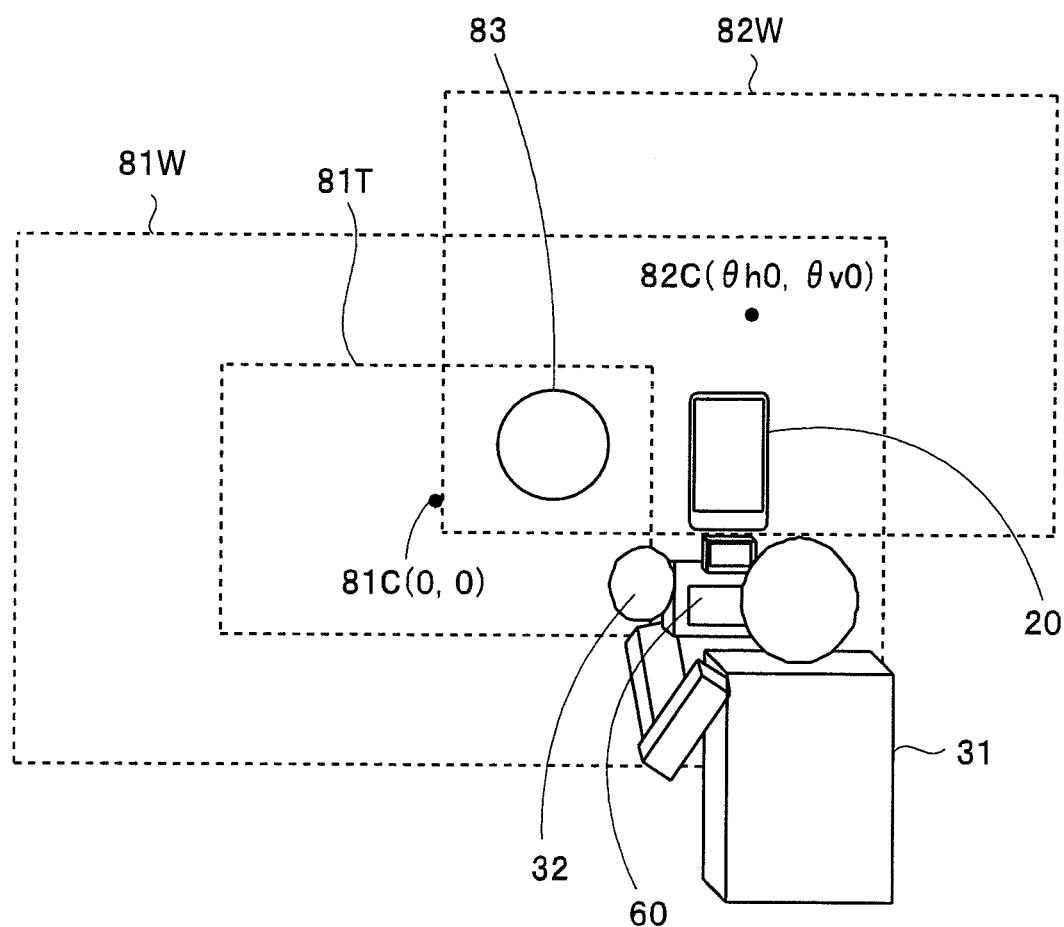
FIG. 11 is an explanatory view for explaining how to give guidance on a photographing direction by a photographing direction guidance portion 11f.

FIGS. 11 to 13 are an explanatory view, an explanatory graph, and an explanatory chart for explaining how to give guidance on the photographing direction with the photographing direction guidance portion 11f. FIG. 11 shows a positional relationship among the image pickup ranges of the photographing units 60 and 20 and an object. A photographer 31 performs photographing while supporting the photographing unit 60 with a hand 32. An error between the optical axes of the photographing unit 60 and the different photographing unit 20 (a divergence in photographing direction) causes a divergence between image pickup ranges 81W and 82W, as shown in FIG. 11.

In the example shown in FIG. 11, the photographing direction is indicated by (an elevation/depression angle, an azimuth angle). A center 82C(θh0,θv0) of the wide-angle image pickup range 82W of the photographing unit 20 is defined by using a center of a telephoto image pickup range 81T of the photographing unit 60 as a reference (81C(0,0)). The divergence in optical axis between the photographing units 60 and 20 causes a divergence between center positions (black circle portions) of the image pickup ranges.

A target object 83 is located near a middle of the wide-angle image pickup range 81W of the photographing unit 60, and the target object 83 is located at an upper right end of the telephoto image pickup range 81T of the photographing unit 60. The target object 83 is also located at a lower left end of the wide-angle image pickup range 82W of the photographing unit 20. That is, the target object 83 is located within the image pickup ranges of the photographing units 60 and 20. The photographing direction guidance portion 11f can obtain a position of the center 82C of the image pickup range 82W with reference to the center 81C of the image pickup range 81T as (an elevation/depression angle, an azimuth angle) on the basis of a positional relationship between a position of the target object 83 in the image pickup range 81T and a position of the target object 83 in the image pickup range 82W.

Assume here that the target object 83 (a shaded circle) moves to a position outside the image pickup range 81T, as shown in FIG. 12. Note that in FIG. 12, the center 82C(θh0, θv0) of the image pickup range of the photographing unit 20 uses, as the reference, the center 81C(0,0) of the image pickup range of the photographing unit 60 and that a center position of the target object 83 uses, as a reference, the center 82C(θh0,θv0) of the image pickup range of the photographing unit 20.

When information on the center position of the target object 83 is given from the photographing unit 20, the photographing direction guidance portion 11f gives guidance on the photographing direction in accordance with the table in FIG. 13. In the example in FIG. 13, the photographing direction is indicated by an arrow. For example, if (θhs-θh0) is a value between -θh1 and +θh1, and (θvs+θv0) is a value between -θv1 and +θv1, i.e., the center position is within the image pickup range 81T, no arrow is displayed. For example, if (θhs+θh0) is a value between -θh1 and +θh1, and (θvs+θv0) is a value larger than θv1, i.e., the center position is located above the image pickup range 81T, the photographing direction guidance portion 11f controls a display control portion 11a to display an up arrow.

Action of the embodiment with the above-described configuration will be described with reference to the flowchart in FIG. 14 and the explanatory views in FIGS. 15A and 15B. Procedures in FIG. 14 identical to the procedures in FIG. 7 are denoted by identical reference numerals, and a description of the procedures will be omitted. Note that processes at the time of reproduction are not shown in FIG. 14.

Figure 14:
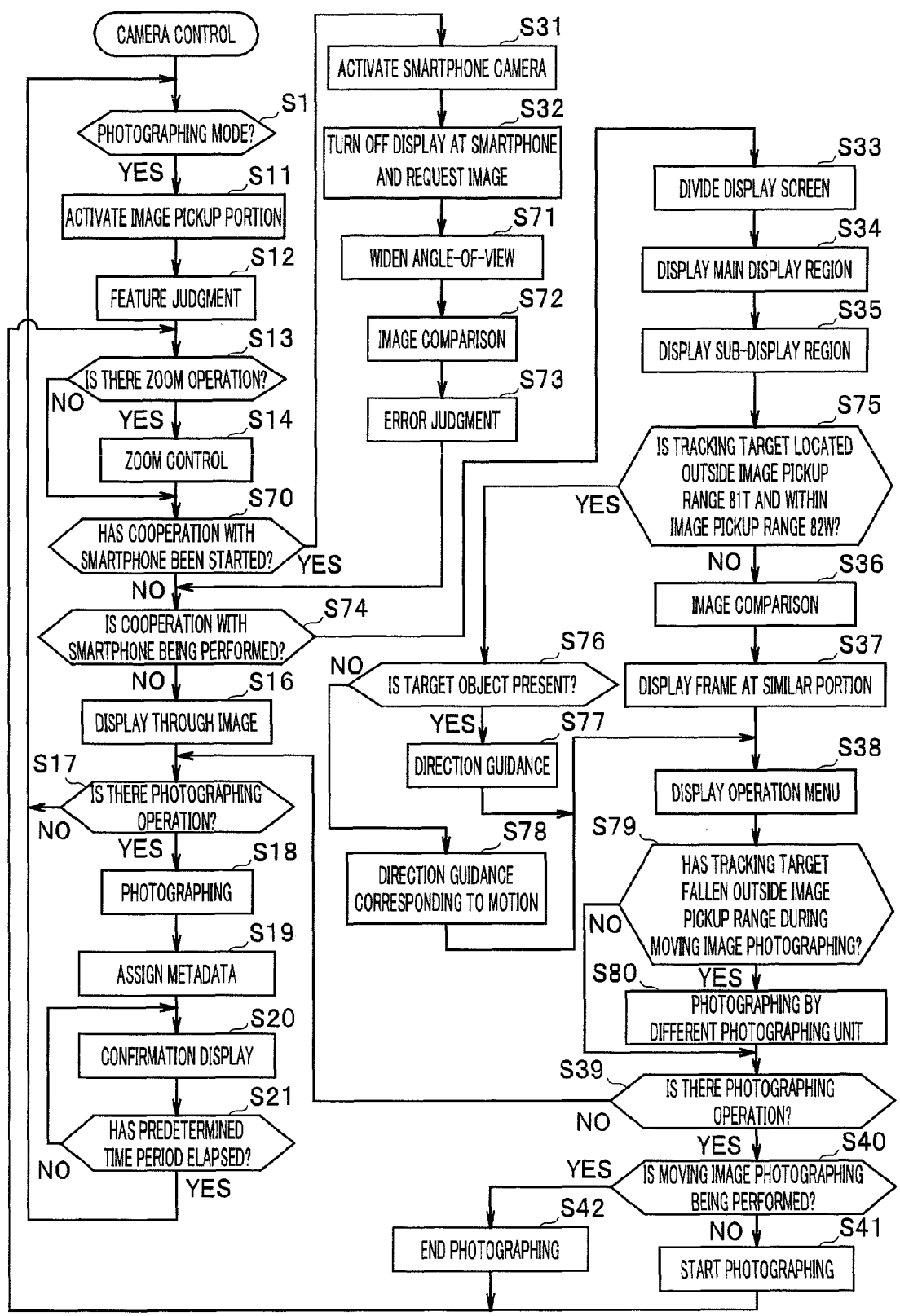
FIG. 14 is a flowchart for explaining action of the second embodiment.

Referring to FIG. 14, if it is judged in step S70 that the mode of photographing in cooperation with a different photographing unit is started, the signal processing and control portion 61 activates the different photographing unit 20 to instruct the different photographing unit 20 to perform wide-angle photographing, blacks out a display portion 28, and requests an image from an image pickup portion 22 (steps S31 and S32).

In the present embodiment, in the cooperative photographing mode, an error between the center position of the image pickup range of the photographing unit 60 and the center position of the image pickup range of the different photographing unit 20 (a divergence in photographing direction) is obtained. First, the signal processing and control portion 61 widens the angle of view of the photographing unit 60 such that an identical object, such as the target object, is likely to be included in both the image pickup ranges of the photographing units 60 and 20 (step S71). Then, the photographing direction guidance portion 11f performs image comparison on image pickup images from the photographing units 60 and 20 (step S72), and obtains an error between center positions of the image pickup images by the technique shown in FIG. 11. For example, the signal processing and control portion 61 obtains the center position of the image pickup image from the photographing unit 20 with reference to the center position of the image pickup image from the photographing unit 60.

Note that if a distance to the target object is sufficiently long, a direction guidance display related to the photographing direction may be displayed afterward by using the error obtained in step S73 as long as the amount of divergence in optical axis between the photographing units 60 and 20 remains unchanged.

The signal processing and control portion 61 judges in step S74 whether the cooperative photographing mode is continuing. If the cooperative photographing mode is continuing, the signal processing and control portion 61 shifts a current process to step S33. In steps S33 to S35, A main display region 41a and a sub-display region 41b are displayed on the display screen 18a of the display portion 18 of the photographing unit 60 (see FIG. 4).

In next step S75, the photographing direction guidance portion 11f judges, on the basis of the image pickup images from the photographing units 60 and 20, whether a tracking target is located outside the image pickup range of the photographing unit 60 and within the image pickup range of the photographing unit 20. At the point, the tracking target, such as the target object, is often located in both the image pickup ranges of the photographing units 60 and 20, and the current process shifts from step S75 to step S36. In the above-described manner, an angle-of-view display 46 indicating the image pickup range in the main display region 41a is displayed in the sub-display region 41b (step S37), as in the first embodiment.

Assume here that a zoom operation is performed at the photographing unit 60 and that the image pickup range changes to the telephoto image pickup range 81T. Also, assume that the tracking target moves to a position outside the image pickup range 81T and within the image pickup range 82W of the photographing unit 20.

In the case, the photographing direction guidance portion 11f shifts the current process from step S75 to step S76 to judge whether the target object is present. After the judgment, the photographing direction guidance portion 11f displays, for example, an arrow display for direction guidance within the screen by using the technique in FIGS. 12 and 13 in step S77. If the target object is not present (e.g., when the target object is not set), the photographing direction guidance portion 11f regards an object in rapid motion as a tracking object and gives direction guidance corresponding to the motion (step S78).

Figure 15A:
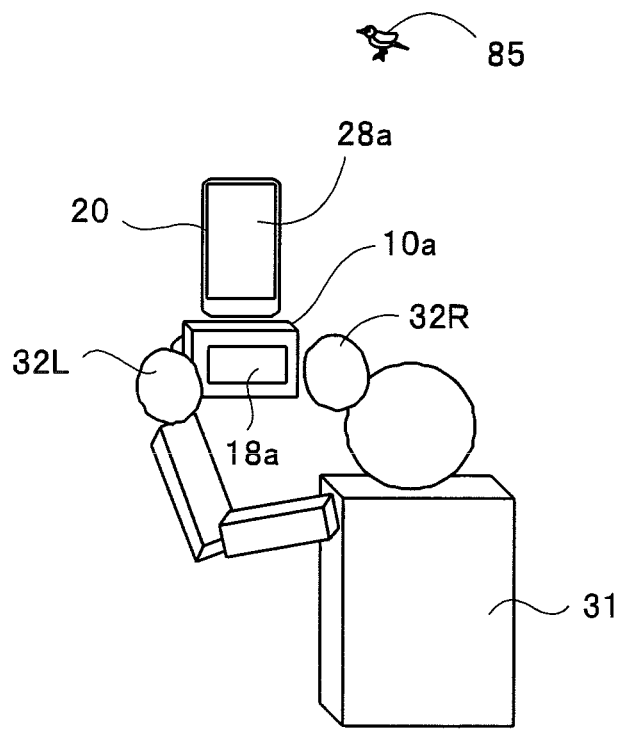
FIGS. 15A and 15B are explanatory views for explaining the action of the second embodiment.
Figure 15B:
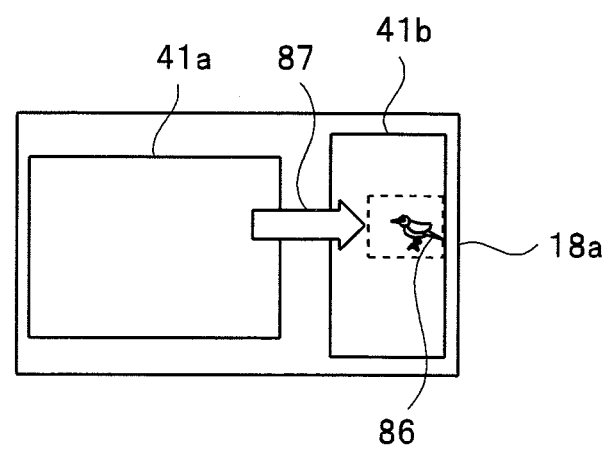

FIG. 15A shows how the photographer 31 is trying to photograph a target object 85 while supporting the housing 10a with hands 32L and 32R. The target object 85 is located to a right side of the image pickup range of the photographing unit 60 and within the image pickup range of the photographing unit 20. In the case, the photographing direction guidance portion 11f controls a display control portion 11a to display a direction guidance display 87, indicating that the photographing direction should be moved to a right side in order to photograph the target object 85, on the display screen 18a (FIG. 15B).

The photographing direction guidance portion 11f can display a direction guidance display according to FIG. 13 on the display screen 18a. The photographer can thus recognize in which direction the photographing unit 60 needs to be directed to track a target object while viewing the direction guidance display on the display screen 18a.

In the present embodiment, the signal processing and control portion 61 judges whether the tracking target has moved to outside the image pickup range of the photographing unit 60 during telephoto moving image photographing by the photographing unit 20 (step S79). If the tracking target has moved, the signal processing and control portion 61 causes the different photographing unit 20 to perform moving image photographing (step S80). With the configuration, even if moving image photographing of the target object cannot be performed by the photographing unit 60, wide-angle moving image photographing by the different photographing unit 20 is possible. Note that in the case, not only moving image photographing by the photographing unit 60 but also moving image photographing by the photographing unit 20 are stopped in step S42.

As described above, in the present embodiment, even if a tracking target falls outside an image pickup range, when image pickup of the tracking target is being performed by a different photographing unit, a direction in which a photographing unit is to be directed to perform image pickup of the tracking target can be obtained, and the direction can be displayed as a direction guidance display on a display portion. A photographer can thus easily track even an object in rapid motion. Additionally, a direction guidance display is displayed near a display region for a through image, and confirmation of the direction guidance display is easy.

Note that although a direction in which a photographing unit is directed to track a tracking target is given to a user by using a direction guidance display in the above-described embodiment, the direction may be given to the user by using sound indicating the direction in which the photographing unit is directed to track the tracking target.

Each of the embodiments of the present invention has been described as using a digital camera as a unit for photographing. Examples of the camera include a digital single-lens reflex camera, a compact digital camera, and cameras for moving images, such as a video camera and a movie camera. The camera may, of course, be a camera built in a PDA (personal digital assistant), such as a mobile phone or a smartphone.

The present invention is not limited to the above-described individual embodiments per se. At an implementation stage, constituent elements can be modified and embodied without departing from spirit of the present invention. Various inventions can be formed by appropriately combining the plurality of constituent elements disclosed in the individual embodiments. For example, some of all the constituent elements in the embodiments may be deleted. Further, constituent elements across different embodiments may be appropriately combined.

Note that even if action flows in the claims, the specification, and the drawings have been described using the expressions "first" and "then" and the like for convenience, the description is not intended to mean that actions have to be implemented in the described order. A part not affecting essence of the invention of individual steps constituting each action flow can, of course, be appropriately omitted.

Note that, of the technologies described above, control described mainly with reference to a flowchart can often be set with a program and that such a program may be stored in a recording medium or a recording portion. Recording on a recording medium or in a recording portion may be performed at the time of product shipping, may be performed by utilizing a distributed recording medium, or may be performed through download over the Internet.

What is claimed is:

1. A photographing unit comprising:
   an image pickup portion which outputs a first image pickup image obtained through photographing of an object;
   a display control portion which causes the first image pickup image from the image pickup portion and a second image pickup image from a different photographing unit to be displayed on an identical display screen, the different photographing unit being configured to photograph an image pickup range including an image pickup range of the first image pickup image;
   an image comparison portion which compares the first image pickup image with the second image pickup image; and
   an angle-of-view display portion which controls the display control portion on the basis of a comparison result from the image comparison portion to cause a frame image indicating the image pickup range of the first image pickup image to be displayed in the second image pickup image,
   wherein the angle-of-view display portion (1) sets a feature in a specific range within the first image pickup image as a judgment target image, (2) sets, in the second image pickup image, a judgment region identical in size to the judgment target image, (3) judges similarity by comparing the judgment target image with an image in the judgment region set, (4) moves the set judgment region and (5) repeats the act of judging similarity by comparing the judgment target image with an image in the moved judgment region, (6) changes a size of the judgment target image by scaling, up or down, the judgment target image, and (7) repeats the acts of setting a judgment region, judging similarity, moving the set judgment region and repeating the act of judging similarity using the changed size judgment target image.

2. The photographing unit according to claim 1, further comprising
   a connection unit control portion which controls at least one of image pickup processing, image display processing, and image communication processing by the different photographing unit.

3. The photographing unit according to claim 2, further comprising
   a connection portion to which the different photographing unit is connectable, wherein
   the connection unit control portion starts controlling the at least one processing when the different photographing unit is connected to the connection portion.

4. The photographing unit according to claim 1, further comprising
   a connection unit control portion which controls image pickup processing by the different photographing unit, wherein
   the connection unit control portion instructs the different photographing unit to perform wide-angle image pickup.

5. The photographing unit according to claim 1, further comprising
   a connection unit control portion which controls image communication processing by the different photographing unit, wherein
   the connection unit control portion causes the different photographing unit to send the first image pickup image by utilizing a communication function of the different photographing unit.

6. The photographing unit according to claim 1, further comprising
   a connection unit control portion which controls image pickup processing and image display processing by the different photographing unit, wherein
   the connection unit control portion requests the different photographing unit to transfer the second image pickup image and stops image display at the different photographing unit.

7. The photographing unit according to claim 1, further comprising
   a photographing direction guidance portion which controls the image comparison portion to detect an error between an image pickup range of the image pickup portion and an image pickup range of the different photographing unit and obtain information on a position of an object that is not included in the first image pickup image and is included in the second image pickup image and controls the display control portion to display a direction guidance display corresponding to the information on the position of the object on the identical display screen.

8. The photographing unit according to claim 1, further comprising
   a mounting portion which has an optical axis adjustment mechanism for causing an optical axis of the image pickup portion and an optical axis of the different photographing unit to coincide.

9. A cooperative photographing method comprising:
an image pickup step of photographing an object and acquiring a first image pickup image;
an image comparison step of comparing the first image pickup image with a second image pickup image from a different photographing unit; and
an angle-of-view display step of displaying the first image pickup image and the second image pickup image on an identical display screen and displaying a display indicating an image pickup range of the first image pickup image in the second image pickup image on the basis of a comparison result in the image comparison step by (1) setting a feature in a specific range within the first image pickup image as a judgment target image, (2) setting, in the second image pickup image, a judgment region identical in size to the judgment target image, (3) judging similarity by comparing the judgment target image with an image in the judgment region set, (4) moving the set judgment region, (5) repeating the act of judging similarity by comparing the judgment target image with an image in the moved judgment region, (6) changing a size of the judgment target image by scaling, up or down, the judgment target image, and (7) repeating the acts of setting a judgment region, judging similarity, moving the set judgment region and repeating the act of judging similarity using the changed size judgment target image.

10. The cooperative photographing method according to claim 9, further comprising
a connection unit control step of controlling at least one of image pickup processing, image display processing, and image communication processing by the different photographing unit.

11. The cooperative photographing method according to claim 9, further comprising
a step of instructing the different photographing unit to perform wide-angle image pickup.

12. A non-transitory computer-readable recording medium having a recorded program for causing a computer to execute:
an image pickup step of photographing an object and acquiring a first image pickup image;
an image comparison step of comparing the first image pickup image with a second image pickup image from a different photographing unit; and
an angle-of-view display step of displaying the first image pickup image and the second image pickup image on an identical display screen and displaying a display indicating an image pickup range of the first image pickup image in the second image pickup image on the basis of a comparison result in the image comparison step by
(1) setting a feature in a specific range within the first image pickup image as a judgment target image,
(2) setting, in the second image pickup image, a judgment region identical in size to the judgment target image,
(3) judging similarity by comparing the judgment target image with an image in the judgment region set,
(4) moving the set judgment region,
(5) repeating the act of judging similarity by comparing the judgment target image with an image in the moved judgment region,
(6) changing a size of the judgment target image by scaling, up or down, the judgment target image, and
(7) repeating the acts of setting a judgment region, judging similarity, moving the set judgment region and repeating the act of judging similarity using the changed size judgment target image.

13. The computer-readable recording medium according to claim 12, wherein
the program causes the computer to execute
a connection unit control step of controlling at least one of image pickup processing, image display processing, and image communication processing by the different photographing unit.

14. A photographing unit comprising:
an image pickup portion which outputs a first image pickup image obtained through photographing of an object;
a display control portion which causes the first image pickup image from the image pickup portion and a second image pickup image from a different photographing unit to be displayed on an identical display screen, the different photographing unit being configured to photograph an image pickup range including an image pickup range of the first image pickup image;
an image comparison portion which compares the first image pickup image with the second image pickup image; and
an angle-of-view display portion which controls the display control portion on the basis of a comparison result from the image comparison portion to cause the image pickup range of the first image pickup image in the second image pickup image to be displayed in a display form different from a display form of another region in the second image pickup image,
wherein the angle-of-view display portion regards an image in a specific range in the first image pickup image as a judgment target image, to set, in the second image pickup image, a judgment region identical in size to the judgment target image, and obtains the image pickup range of the first image pickup image by performing similarity judgment by comparing the judgment target image with an image in the judgment region while moving the set judgment region, the similarity judgment being performed while changing size of the judgment target image by scaling up or down the judgment target image.

* * * * *